United States Patent
Li et al.

(10) Patent No.: US 10,902,450 B2
(45) Date of Patent: Jan. 26, 2021

(54) CUSTOMER-ASSISTED ITEM RETRIEVAL

(71) Applicant: INTERNATIONAL BUSINESS MACHINES CORPORATION, Armonk, NY (US)

(72) Inventors: Jialin Li, Westford, MA (US); Pradeep K. Nanjundaswamy, Bangalore (IN); Srikanth Sundararajan, Cambridge, MA (US); Danai Tengtrakool, Burlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 807 days.

(21) Appl. No.: 15/479,726

(22) Filed: Apr. 5, 2017

(65) Prior Publication Data
US 2018/0293604 A1  Oct. 11, 2018

(51) Int. Cl.
*G06Q 30/00* (2012.01)
*G06Q 30/02* (2012.01)

(52) U.S. Cl.
CPC ..... *G06Q 30/0224* (2013.01); *G06Q 30/0208* (2013.01)

(58) Field of Classification Search
None
See application file for complete search history.

(56) References Cited

U.S. PATENT DOCUMENTS

| | | | |
|---|---|---|---|
| 8,972,168 B2 | 3/2015 | Acker, Jr. et al. | |
| 2006/0163349 A1* | 7/2006 | Neugebauer | G06Q 20/387 235/383 |
| 2015/0084745 A1 | 3/2015 | Hertz et al. | |
| 2016/0048798 A1* | 2/2016 | Meyer | G01G 19/4144 705/28 |
| 2016/0055451 A1 | 2/2016 | Waters et al. | |
| 2016/0225006 A1* | 8/2016 | Chen | G06F 16/9535 |
| 2017/0193434 A1* | 7/2017 | Shah | G06K 9/00771 |
| 2017/0228829 A1* | 8/2017 | Alhalabi | G06Q 50/01 |
| 2018/0080784 A1* | 3/2018 | Narasimhan | G01C 21/3476 |

FOREIGN PATENT DOCUMENTS

WO  2016063318 A1  4/2016

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

*Primary Examiner* — Michael W Schmucker
(74) *Attorney, Agent, or Firm* — Stephanie Carusillo, Esq.; Hye Jin Lucy Song, Esq.; Heslin, Rothenberg, Farley & Mesiti P.C.

(57) ABSTRACT

Methods, computer program products, and systems are presented. The methods include, for instance: determining that an item misplaced in a venue may be retrieved by one or more customer. A candidate customer may be identified and rewards that may be offered are compiled. The candidate customer is selected as one who is predicted to be most likely to respond to a request for retrieval, and a reward is selected for cost effectiveness in retrieving the item. The request to retrieve the item is sent to the candidate customer.

18 Claims, 5 Drawing Sheets

CUSTOMER-ASSISTED ITEM RETRIEVAL

TECHNICAL FIELD

The present disclosure relates to inventory management technology, and more particularly to methods, computer program products, and systems for obtaining assistance from in-venue customers in retrieving misplaced items.

BACKGROUND

In conventional retail venue environment, searching for items that had been misplaced in a venue requires extra time and effort, which increases the cost of business. Customers may remove the items freely from designated shelfs while shopping but later discard the item somewhere in the venue without checking the items out. Accordingly, the venue may see the item as inventoried and available on the records but may not find it at the designated shelfs, which may result in lost sales, extra cost, etc.

SUMMARY

The shortcomings of the prior art are overcome, and additional advantages are provided, through the provision, in one aspect, of a method. The method for retrieving one or more item by using one or more customer in a venue includes, for example: obtaining, by one or more processor, an input indicating that an item from the one or more item of a venue has been misplaced; determining, by the one or more processor, that the item may be retrieved by the one or more customer, wherein the one or more customer is present in the venue; identifying, by the one or more processor, the one or more customer in the venue that are predicted to respond to a request for retrieval of the misplaced item in the venue in exchange for one or more reward; generating, by the one or more processor, a list of the one or more reward, wherein the one or more reward from the list may be offered to the one or more customer from identifying; generating, by the one or more processor, the request that includes a customer from the one or more customers and a reward from the list, wherein the customer is predicted to be most likely to respond to the request amongst the one or more customer from the identifying, wherein the request promises the customer the reward in exchange for the retrieval and delivery of the misplaced item in the venue, and wherein the reward is associated with a cost to the venue that is lower than another cost corresponding to other reward from the list; and sending, by the one or more processor, the request to the customer.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
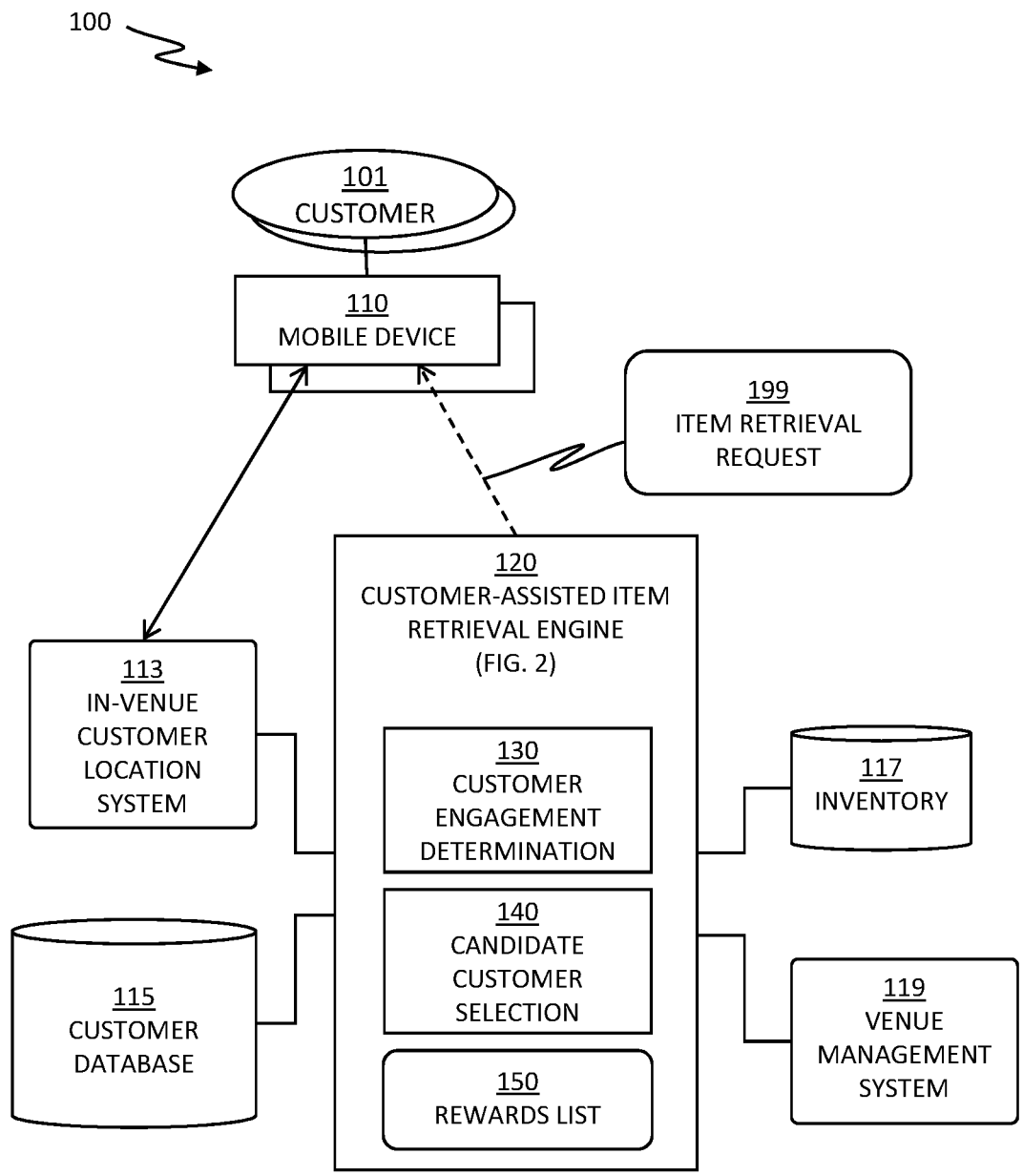
FIG. 1 depicts a system for retrieving a misplaced item with assistance from customers, in accordance with one or more embodiments set forth herein.

FIG. 1 depicts a system 100 for retrieving a misplaced item with assistance from customers, in accordance with one or more embodiments set forth herein.

The system 100 includes one or more customer, one or more mobile device, an in-venue customer location system 113, a customer database 115, an inventory 117, a venue management system 119, and a customer-assisted item retrieval engine 120. As noted, misplaced items that is accounted in the inventory but not available at a designated shelf may lead to a loss of sales, and need to be found at the earliest opportunity.

A customer 101 of the one or more customer carries around a mobile device 110 of the one or more mobile device in a venue that is managed by the venue management system 119 that is coupled to the customer-assisted item retrieval engine 120. The venue is a brick and mortar retail location having a physical area equipped with the in-venue customer location system 113 that locates the customer 101 by monitoring location data sent from the mobile device 110 by use of geo-fencing, beaconing, etc. The customer-assisted item retrieval engine 120 communicates with the customer 101 via the mobile device 110 by use of the venue customer location system 113 and/or other mobile communication networks which may include a public wireless service provider for the mobile device 110.

The customer database 115 stores information on the one or more customer, including, but not limited to, customer profiles, transaction histories, wish lists, etc., respective to each of the one or more customer. The inventory 117 stores information on items of the venue, including, but not limited to, item identification, item description including handling instruction, respective number of units in stock, prices, etc., respective to each of all the items. The venue management system 119 keeps track of sales and updates the inventory 117 by use of automated inventory technique such as a Point of Sale (POS) system. The venue management system 119 may be linked to a website of the venue on which the items are offered for sale.

The customer-assisted item retrieval engine 120 includes a customer engagement determination process 130, a candidate customer selection process 140, and rewards list 150. The customer engagement determination process 130 indicates a functional component in which the customer-assisted item retrieval engine 120 determines whether or not to recruit customers in order to retrieve one or more misplaced item in the venue. The candidate customer selection process 140 indicates another functional component in which the candidate customer selection process 140 identifies candidate customers in the venue that is likely to assist in retrieving the misplaced item. The customer-assisted item retrieval engine 120 compiles rewards for each candidate customers as identified and stores in the rewards list 150 in order to select the most cost-effective reward and to contact the candidate customers in an order of increasing cost. The customer-assisted item retrieval engine 120 generates an item retrieval request 199 for the customer 101, and subsequently sends to the mobile device 101 via available communication channel including, but not limited to, the venue customer location system 113 and/or coupled mobile communication networks. The customer engagement determination process 130, the candidate customer selection process 140, and the rewards list 150 respectively indicates functional elements of the customer-assisted item retrieval engine 120, and may or may not be implemented as a corresponding physical process. Details of operations by customer-assisted item retrieval engine 120 are presented in FIG. 2 and corresponding description.

Figure 2:
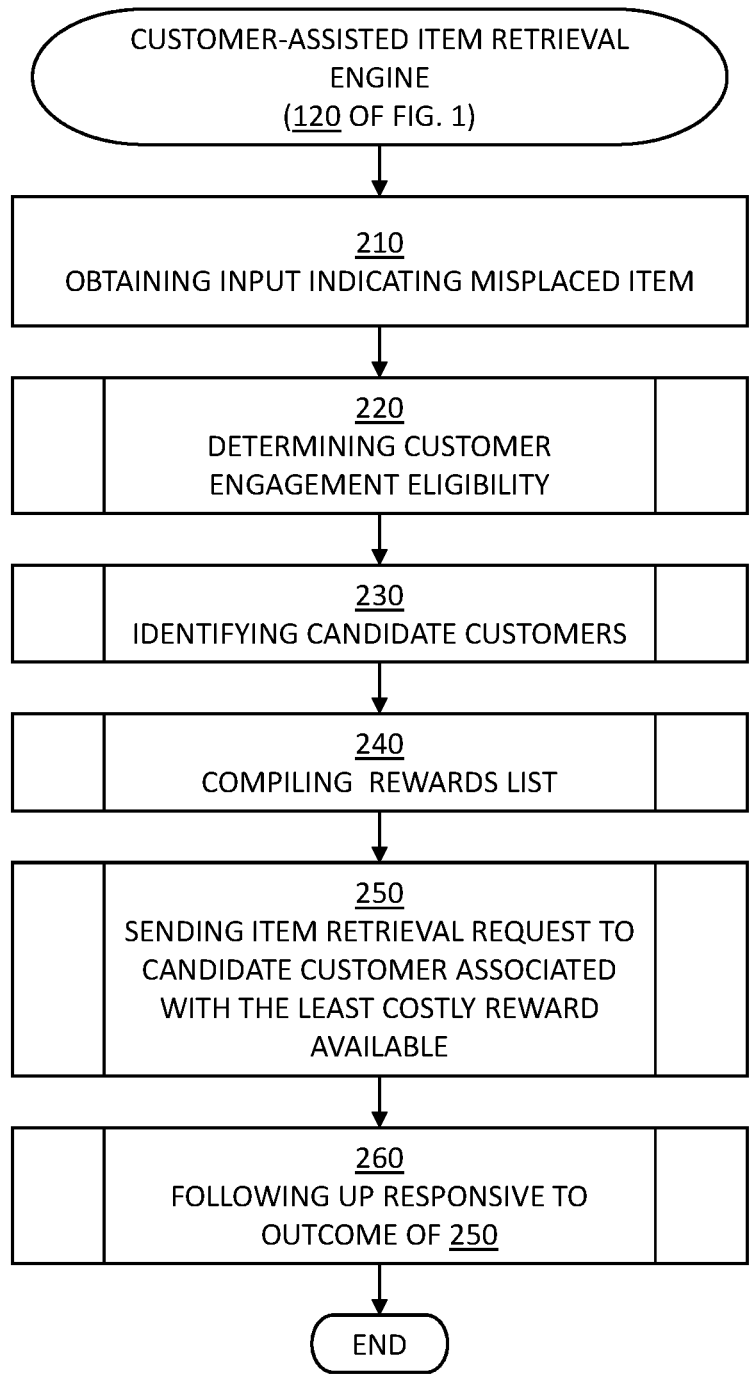
FIG. 2 depicts a flowchart performed by the customer-assisted item retrieval engine of the system, in accordance with one or more embodiments set forth herein.

FIG. 2 depicts a flowchart performed by the customer-assisted item retrieval engine 120 of FIG. 1, in accordance with one or more embodiments set forth herein.

In block 210, the customer-assisted item retrieval engine 120 receives an input indicating that one or more item had been misplaced in a venue. A venue employee may provide the input upon discovering a discrepancy between a number of units shown as available from the inventory and a number of units physically on a designated shelf of each item. Such discrepancy may be discovered by a complaint from a customer reporting a lack of the item on the shelf while being offered on a venue website as available, regular venue operation such as shelf inventory check/shelf stocking, etc. Because the number of items sold and the number of units available according to sales are automatically tracked by using a Point of Sale (POS) system of the venue, the discrepancy is interpreted as a misplaced item in the venue and provided to the customer-assisted item retrieval engine 120 as the input. Then the customer-assisted item retrieval engine 120 proceeds with block 220.

In block 220, the customer-assisted item retrieval engine 120 determines whether or not the item is suitable for the customer-assisted retrieval based on preconfigured eligibility factors and/or venue rules. Examples of the eligibility factors may include, but are not limited to, a value of the item, a level of easiness to identify the item such as easily identifiable shape and color of package, descriptive languages, etc., and handling requirements of the item such as weight, size/dimensions, handling instruction, etc. For example, if the item looks very similar to another item on the package, then the item may not be eligible. Then the customer-assisted item retrieval engine 120 proceeds with block 230 for the item that is eligible for the customer-assisted retrieval. If the customer-assisted item retrieval engine 120 determines that the item specified in the input is not eligible for the customer-assisted retrieval, then the customer-assisted item retrieval engine 120 terminates processing the input and informs as such.

In block 230, the customer-assisted item retrieval engine 120 identifies multiple candidate customers by use of customer locations and respective customer profiles and/or transaction histories. The customer locations are available from data gathered by the in-venue customer location system 113 such as geo-fencing, beaconing, etc. A primary purpose of the in-venue customer location system 113 is location marketing focused on in-venue customers, and accordingly, each customer in the venue may be readily identified along with which area of the venue the customers are presently located, provided that each customer carries a detectable mobile device such as a cell phone. For the located in-venue customers, the customer-assisted item retrieval engine 120 reviews respective customer profiles and/or transaction history in order to determine how each customer may respond to a request for assistance. For example, the customer profile may have a pre-registration indicating that the customer agrees with providing in-venue assistance in exchange of coupons and/or discounts, as part of a venue membership. For another example, the customer transaction history may have a record of previous retrieval assistance offered by the customer, how often the customer uses coupons and/or utilizes promotions from the venue by shopping items on markdown prices, clearance, buy-one-get-one, etc. The customer-assisted item retrieval engine 120 identifies the candidate customers amongst the in-venue customers who have signed up for the assistance, previously helped with retrieving misplaced items, and/or are likely to help for rewards such as coupons and discounts. Then the customer-assisted item retrieval engine 120 proceeds with block 240.

In block 240, the customer-assisted item retrieval engine 120 compiles a rewards list for each candidate customer identified in block 230, based on the value/profit margin of the item, respective costs of the rewards, cost of finding the item by venue employees, how urgently the item needs to be located, etc. In certain embodiments of the present invention, the rewards list includes personalized rewards that is customized for a specific candidate customer in order to reduce the cost of the reward offered and to increase the chance of response to a retrieval request. In other embodiments of the present invention, the rewards list includes all rewards less costly than the profit associated with the misplaced item. For example, the customer-assisted item retrieval engine 120 may utilize information stored in the wish list of a candidate customer and generate a reward that offers a special discount for an item in the wish list, which may cost much less than other rewards but be of great interest to this candidate customer. Examples of the reward may include, but are not limited to, coupons, a percentage off from a next purchase, venue rewards points, a free promotional item, etc. Then the customer-assisted item retrieval engine 120 proceeds with block 250.

In block 250, the customer-assisted item retrieval engine 120 selects one or more candidate customer who is most likely to assist and/or associated with the least costly reward available from the rewards list. The customer-assisted item retrieval engine 120 sends an item locating request to each the selected candidate customer by use of text message, etc. The item locating request may include, but not limited to, description of the item, a timeframe to complete the assistance by bringing the item to a designated spot in the venue such as a certain register, customer service desk, etc., and a reward offered for a successful assistance upon completion, etc. Wherein the time allowed to retrieve the item is too short, the customer-assisted item retrieval engine 120 may select a large number of candidate customers to increase the probability to retrieve the item in time, based on increasing the number of positively responding candidate customers. Then the customer-assisted item retrieval engine 120 proceeds with block 260.

In block 260, the customer-assisted item retrieval engine 120 determines whether or not the item sought has been retrieved within the timeframe specified in the item locating request. If the customer-assisted item retrieval engine 120 determines that the item has been retrieved within the timeframe, the customer-assisted item retrieval engine 120 presents the reward offered and terminates processing or loops back to block 210 for a new input. If the customer-assisted item retrieval engine 120 determines that the item has not been retrieved and that the timeframe had lapsed, the customer-assisted item retrieval engine 120 selects another candidate customer who is the next likely to assist and/or associated with the next least costly reward available from the rewards list and sends a new item locating request to the selected another candidate customer. The customer-assisted item retrieval engine 120 may iterate the selection of next candidate customer and send another item locating request, until all rewards from the rewards list are offered without any assistance from the selected candidate customers, or until the closing time of the venue, etc., or any other due time as configured by the venue management system and/or venue rules of operation. Upon determining that all opportunities to retrieve the misplaced item by customer assistance, the customer-assisted item retrieval engine 120 reports as such to the venue management system such that the venue employees may look for the misplaced item, by searching isle by isle, etc. Then the customer-assisted item retrieval engine 120 terminates processing or loops back to block 210 for a new input.

For example, as in the case where the customer purchased the item from the venue website by the inventory data indicating that the item is available and put in a pickup time for the item, the venue may discover that the item has been misplaced when a venue employee goes to the designated shelf to prepare the item for the customer. The venue employee needs to urgently retrieve the item before the pickup time, but if there is no time and manpower to search the entire venue, then the customer-assisted item retrieval engine 120 may be very well be of service.

Certain embodiments of the present invention may offer various technical computing advantages, including automated cost-effectiveness analysis weighing in the cost that may be saved in retrieving a misplaced item and the cost of rewards to be offered to customers in order to secure the help intended. A location marketing system installed in the venue is utilized to identify candidate customers who are present in a venue. The location marketing system is utilized and/or improved to communicate with the candidate customers. The candidate customers are selected by analyzing respective tendencies leading to a likelihood of each candidate customer to positively respond to a request to retrieve the misplaced item from the venue. The rewards may be determined based on personal preferences of the candidate customers as shown from previous purchases and wish lists. A reward offered for retrieving the misplaced item may also generate additional sales and corresponding profit as the candidate customers is likely to return to the venue later to use the reward. By saving the time and effort on the venue to search for the misplaced item, the venue operation may become more efficient and profitability may be improved as well. Also by use of multithreading and/or multiprocessing, a customer-assisted item retrieval service may be rendered for any number of kinds and numbers of misplaced items concurrently. Certain embodiments of the present invention may be implemented by use of a cloud platform/data center, and the customer-assisted item retrieval service may be provided as a subscribed service for retailer clients.

Figure 3:
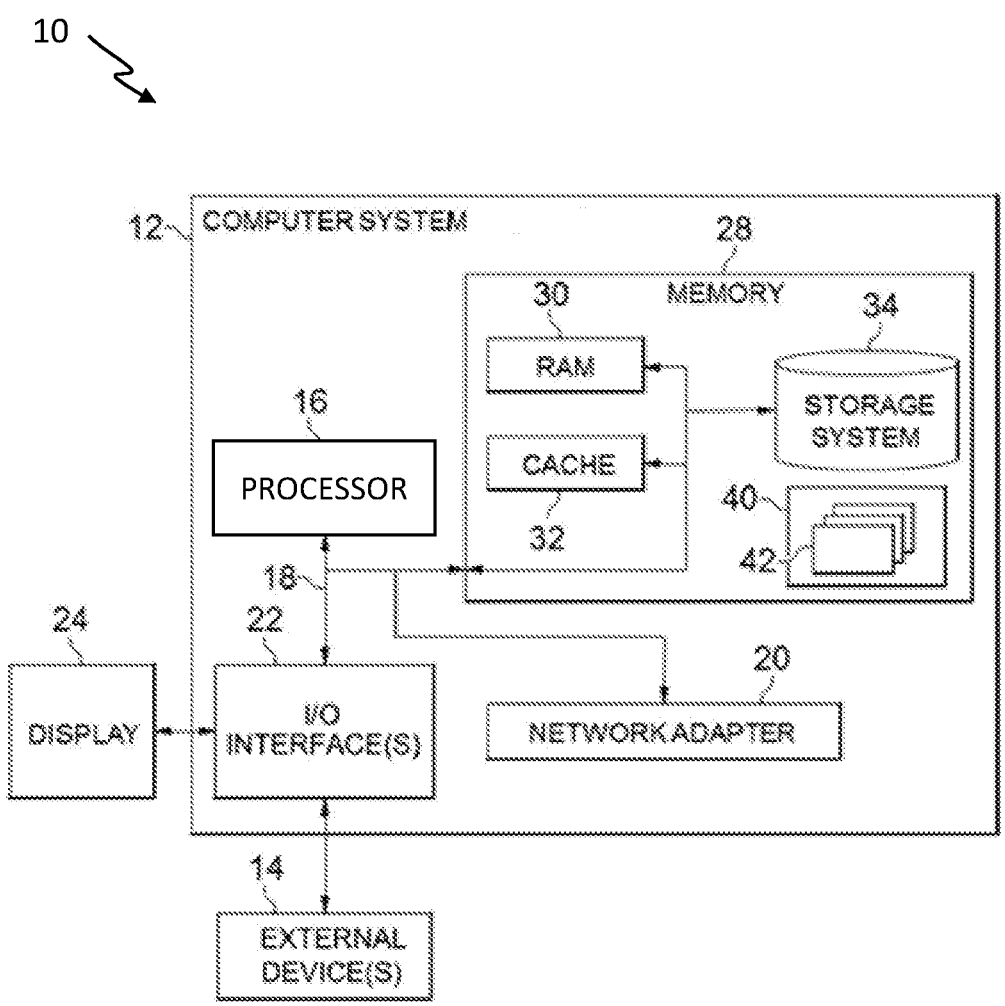
FIG. 3 depicts a cloud computing node according to an embodiment of the present invention.
Figure 4:
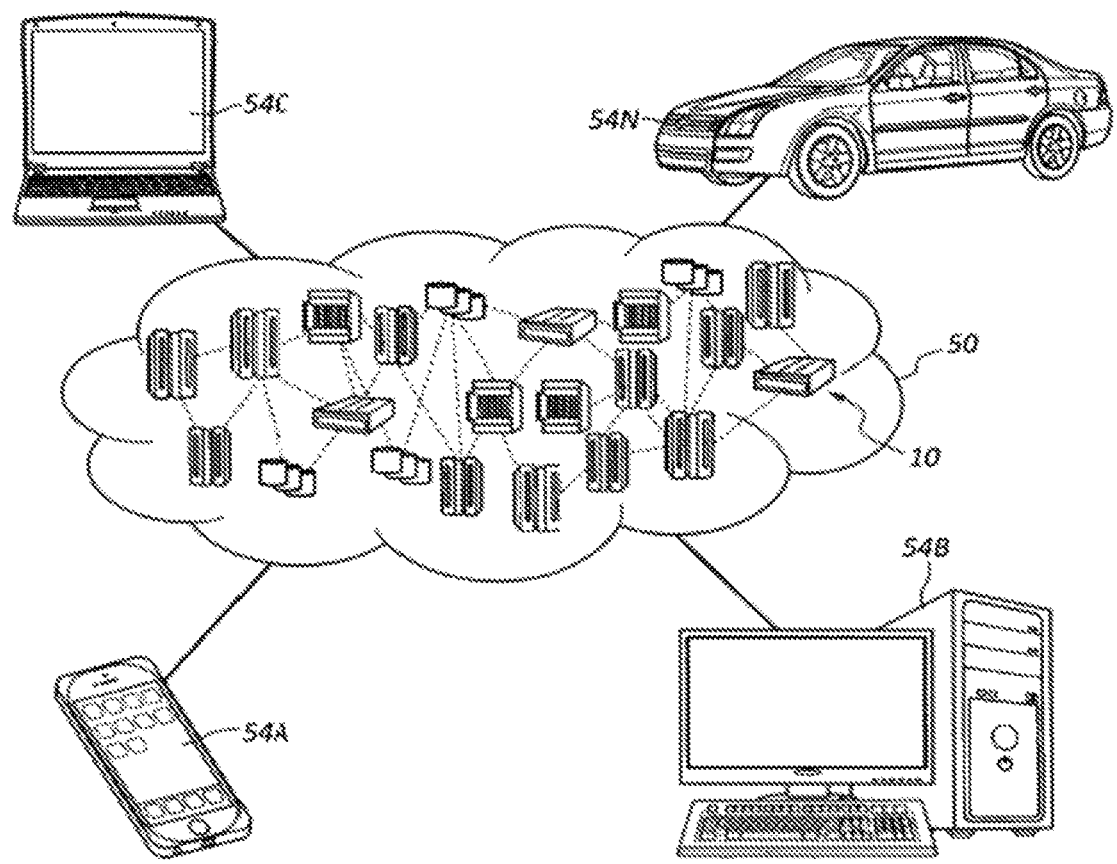
FIG. 4 depicts a cloud computing environment according to an embodiment of the present invention.
Figure 5:
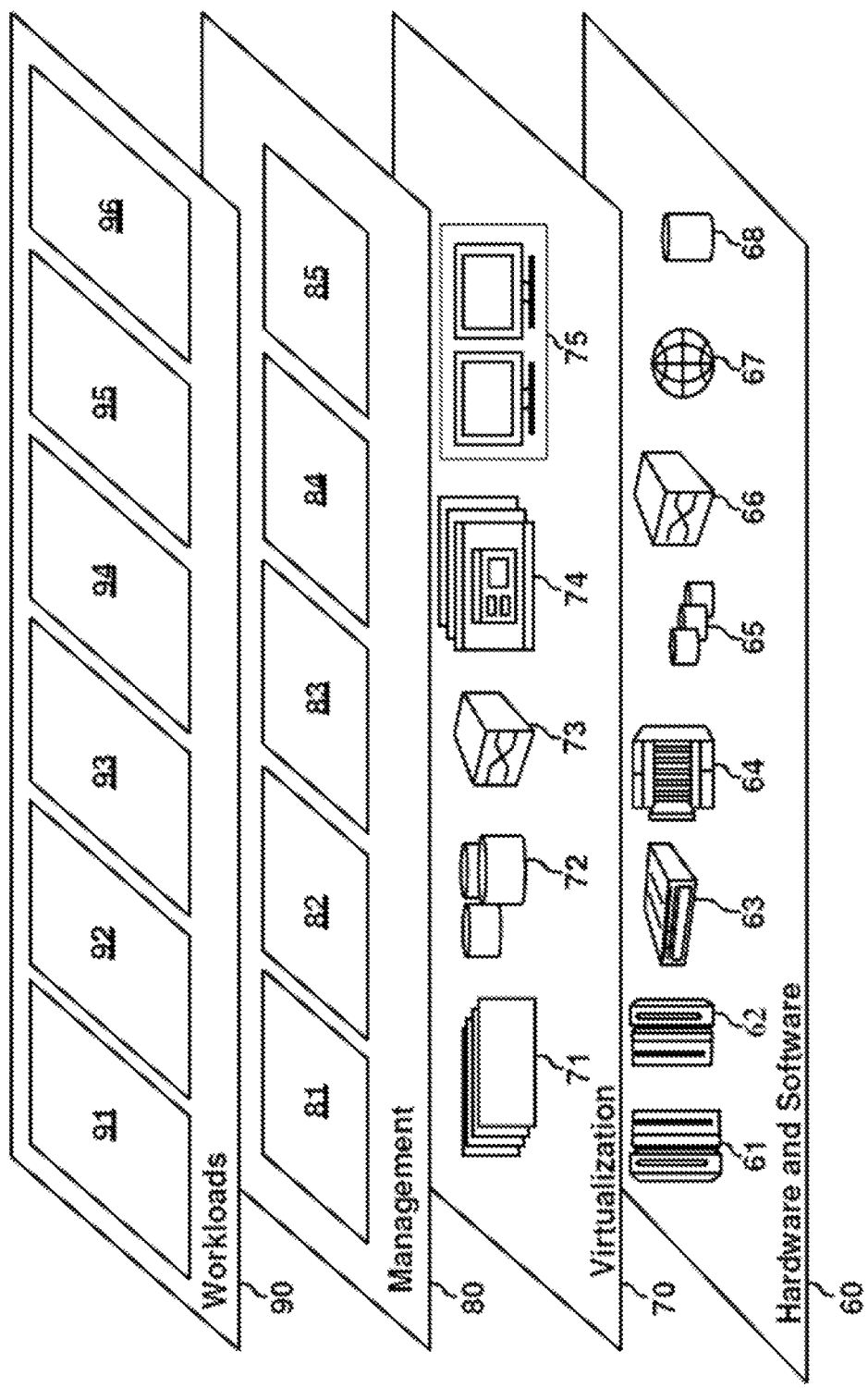
FIG. 5 depicts abstraction model layers according to an embodiment of the present invention.

FIGS. 3-5 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 3, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the customer-assisted item retrieval engine 120 of FIG. 1. Program processes 42, as in the customer-assisted item retrieval engine 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the customer-assisted item retrieval engine 96, as described herein. The processing components 96 can be understood as one or more program 40 described in FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and venue instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method, comprising:

discovering, by one or more processor, a discrepancy between a number of available units of an item from one or more item inventoried at a venue from an inventory of the item kept by an automated inventory system and an actual number of units of the item physically present in the venue, wherein the venue is a physical retail area installed with an venue customer location system, wherein the automated inventory system is a Point of Sale system of the venue, and wherein the one or more processor, the venue customer location system, and the Point of Sale system are operatively coupled for data communication via a communication network;

obtaining, by the one or more processor, an input indicating that the item from the one or more item has been misplaced within the venue based on the discrepancy from the discovering;

determining, by the one or more processor, that the item is characterized as being suitable for retrieval by one or more customer based on eligibility factors for the item and venue rules, wherein the venue rules specify respective conditions on the eligibility factors to meet with respect to a value of the item, a level of easiness to identify the item, and handling requirements of the item;

identifying, by the one or more processor, the one or more customer currently present in the venue based on that respective mobile devices of the one or more customer are communicating with the venue customer location system via the communication network, wherein the one or more customer corresponds to customer data including transaction histories and wish lists respective to the one or more customer as stored in a customer database coupled to the venue customer location system, predicted to respond to a request for a retrieval of the item misplaced in the venue in exchange for one or more reward;

creating, by the one or more processor, a list of the one or more reward, wherein the one or more reward from the list is to be offered to the one or more customer from identifying;

generating, by the one or more processor, the request that includes a customer from the one or more customers from the identifying, a description of the item, a timeframe to complete the request for the retrieval, and a reward from the list from the creating, wherein the customer is predicted to be most likely to respond to the request amongst the one or more customer from the identifying, wherein the request promises the customer the reward in exchange for the retrieval and delivery of the item misplaced in the venue within the timeframe, and wherein the reward is associated with a cost to the venue that is lower than another cost corresponding to other reward from the list;

iterating, by the one or more processor, the generating the request for a plurality of customers amongst the one or more customers as configured in the venue rules, to thereby increase a likelihood to retrieve the item within the timeframe, based on ascertaining that the item is required before the timeframe ends according to the venue rules, that the timeframe is less than a normal length of timeframes configured in the venue rules, and that the request cannot be extended after the timeframe in the request expires; and sending, by the one or more processor, respective to each of the plurality of customers, the request to a mobile device of the customer via the venue customer location system.

2. The computer implemented method of claim 1, the determining comprising:

checking respective instances of the eligibility factors configured for the item, wherein the eligibility factors include a price of the item, a level of easiness to identify the item, and handling requirements of the item; and ascertaining that the item is of value configured for customer-assisted retrieval in the venue rules, that the item is easily identifiable, and that the item may be handled by the customer, based on the respective instances of the eligibility factors and the venue rules.

3. The computer implemented method of claim 1, the identifying comprising:

examining the customer data respectively corresponding to the one or more customer amongst all customers present in the venue; and identifying each customer of the one or more customer as being likely to respond to the request for the retrieval responsive to determining one of: that said each customer had agreed to respond to the request for the retrieval; that said each customer had responded to a previous request for another retrieval; that said each customer often uses coupons; or that said each customer often utilizes promotions in the venue.

4. The computer implemented method of claim 1, the creating comprising:

calculating cost of all rewards available from the venue; and selecting, amongst the all rewards, the one or more reward for the list of the one or more reward responsive to ascertaining that the cost of the one or more reward is less than a profit associated with the item.

5. The computer implemented method of claim 1, the creating comprising:

calculating cost of all rewards available from the venue;

ascertaining that the costs respective to the all rewards are less than a profit associated with the item;

examining the customer data corresponding to a customer, wherein the customer data includes a wish list and a purchase history of the customer; and selecting the one or more reward for the list of the one or more reward responsive to ascertaining that the one or more reward promotes products appearing in the customer data.

6. The computer implemented method of claim 1, further comprising:

ascertaining that the item is recovered by the customer who responded to the request for the retrieval, according to terms of the request; and delivering the reward offered in the request to the customer.

7. A computer program product comprising:

a computer readable storage medium readable by one or more processor and storing instructions for execution by the one or more processor for performing a method comprising;

discovering, by the one or more processor, a discrepancy between a number of available units of an item from one or more item inventoried at a venue from an inventory of the item kept by an automated inventory system and an actual number of units of the item physically present in the venue, wherein the venue is a physical retail area installed with an venue customer location system, wherein the automated inventory system is a Point of Sale system of the venue, and wherein the one or more processor, the venue customer location system, and the Point of Sale system are operatively coupled for data communication via a communication network;

obtaining, by the one or more processor, an input indicating that the item amongst the one or more item of a venue has been misplaced within the venue based on the discrepancy from the discovering;

determining, by the one or more processor, that the item is characterized as being suitable for retrieval by the one or more customer, based on eligibility factors for the item and venue rules, wherein the venue rules specify respective conditions on the eligibility factors to meet with respect to a value of the item, a level of easiness to identify the item, and handling requirements of the item;

identifying, by the one or more processor, the one or more customer currently present in the venue based on that respective mobile devices of the one or more customer are communicating with the venue customer location system via the communication network, wherein the one or more customer corresponds to customer data including transaction histories and wish lists respective to the one or more customer as stored in a customer database coupled to the venue customer location system, predicted to respond to a request for a retrieval of the item misplaced in the venue in exchange for one or more reward;

creating, by the one or more processor, a list of the one or more reward, wherein the one or more reward from the list is to be offered to the one or more customer from the identifying;

generating, by the one or more processor, the request that includes a customer from the one or more customers from the identifying, a description of the item, a timeframe to complete the request for the retrieval, and a reward from the list from the creating, wherein the customer is predicted to be most likely to respond to the request amongst the one or more customer from the identifying, wherein the request promises the customer the reward in exchange for the retrieval and delivery of the item misplaced in the venue within the timeframe, and wherein the reward is associated with a cost to the venue that is lower than another cost corresponding to other reward from the list;

iterating, by the one or more processor, the generating the request for a plurality of customers amongst the one or more customers as configured in the venue rules, to thereby increase a likelihood to retrieve the item within the timeframe, based on ascertaining that the item is required before the timeframe ends according to the venue rules, that the timeframe is less than a normal length of timeframes configured in the venue rules, and that the request cannot be extended after the timeframe in the request expires; and sending, by the one or more processor, respective to each of the plurality of customers, the request to a mobile device of the customer via the venue customer location system.

8. The computer program product of claim 7, the determining comprising:

checking respective instances of eligibility factors configured for the item, wherein the eligibility factors include a price of the item, a level of easiness to identify the item, and handling requirements of the item; and ascertaining that the item is of value configured for customer-assisted retrieval in the venue rules, that the item is easily identifiable, and that the item may be handled by the customer based on the respective instances of the eligibility factors and the venue rules.

9. The computer program product of claim 7, the identifying comprising:

examining the customer data respectively corresponding to the one or more customer amongst all customers present in the venue; and identifying each customer of the one or more customer as being likely to respond to the request for the retrieval responsive to determining one of: that said each customer had agreed to respond to the request for the retrieval; that said each customer had responded to a previous request for another retrieval; or that said each customer often uses coupons; or that said each customer often utilizes promotions in the venue.

10. The computer program product of claim 7, the creating comprising:

calculating cost of all rewards available from the venue; and selecting, amongst the all rewards, the one or more reward for the list of the one or more reward responsive to ascertaining that the cost of the one or more rewards is less than a profit associated with the item.

11. The computer program product of claim 7, the creating comprising:

calculating cost of all rewards available from the venue; ascertaining that the costs respective to the all rewards are less than a profit associated with the item;

examining the customer data corresponding to a customer, wherein the customer data includes a wish list and a purchase history of the customer; and selecting the one or more reward for the list of the one or more reward responsive to ascertaining that the one or more reward promotes products appearing in the customer data.

12. The computer program product of claim 7, further comprising:

ascertaining that the item is recovered by the customer who responded to the request for the retrieval, according to terms of the request; and delivering the reward offered in the request to the customer.

13. A system comprising:

one or more processor; and a memory storing instructions that, when executed by the one or more processor, cause the system to perform:

discovering, by the one or more processor, a discrepancy between a number of available units of an item from one or more item inventoried at a venue from an inventory of the item kept by an automated inventory system and an actual number of units of the item physically present in the venue, wherein the venue is a physical retail area installed with an venue customer location system, wherein the automated inventory system is a Point of Sale system of the venue, and wherein the one or more processor, the venue customer location system, and the Point of Sale system are operatively coupled for data communication via a communication network;

obtaining, by the one or more processor, an input indicating that the item amongst the one or more item of the venue has been misplaced within the venue based on the discrepancy from the discovering;

determining, by the one or more processor, that the item is characterized as being suitable for retrieval by the one or more customer, based on eligibility factors for the item and venue rules, wherein the venue rules specify respective conditions on the eligibility factors to meet with respect to a value of the item, a level of easiness to identify the item, and handling requirements of the item;

identifying, by the one or more processor, the one or more customer currently present in the venue based on that respective mobile devices of the one or more customer are communicating with the venue customer location system via the communication network, wherein the one or more customer corresponds to customer data including transaction histories and wish lists respective to the one or more customer as stored in a customer database coupled to the venue customer location system, predicted to respond to a request for a retrieval of the item misplaced in the venue in exchange for one or more reward;

creating, by the one or more processor, a list of the one or more reward, wherein the one or more reward from the list is to be offered to the one or more customer from identifying;

generating, by the one or more processor, the request that includes a customer from the one or more customers from the identifying, a description of the item, a timeframe to complete the request for the retrieval, and a reward from the list from the creating, wherein the customer is predicted to be most likely to respond to the request amongst the one or more customer from the identifying, wherein the request promises the customer the reward in exchange for the retrieval and delivery of the item misplaced in the venue within the timeframe, and wherein the reward is associated with a cost to the venue that is lower than another cost corresponding to other reward from the list;

iterating, by the one or more processor, the generating the request for a plurality of customers amongst the one or more customers as configured in the venue rules, to thereby increase a likelihood to retrieve the item within the timeframe, based on ascertaining that the item is required before the timeframe ends according to the venue rules, that the timeframe is less than a normal length of timeframes configured in the venue rules, and that the request cannot be extended after the timeframe in the request expires; and sending, by the one or more processor, respective to each of the plurality of customers, the request to a mobile device of the customer via the venue customer location system.

14. The system of claim 13, the determining comprising:
checking respective instances of the eligibility factors configured for the item, wherein the eligibility factors include a price of the item, a level of easiness to identify the item, and handling requirements of the item; and
ascertaining that the item is of value configured for customer-assisted retrieval in the venue rules, that the item is easily identifiable, and that the item may be handled by the customer, based on the respective instances of the eligibility factors and the venue rules.

15. The system of claim 13, the identifying comprising:
examining the customer data respectively corresponding to the one or more customer amongst all customers present in the venue; and
identifying each customer of the one or more customer as being likely to respond to the request for the retrieval responsive to determining one of: that said each customer had agreed to respond to the request for the retrieval; that said each customer had responded to a previous request for another retrieval; that said each customer often uses coupons; or that said each customer often utilizes promotions in the venue.

16. The system of claim 13, the creating comprising:
calculating cost of all rewards available from the venue; and
selecting, amongst the all rewards, the one or more reward for the list of the one or more reward responsive to ascertaining that the cost of the one or more reward is less than a profit associated with the item.

17. The system of claim 13, the creating comprising:
calculating cost of all rewards available from the venue;
ascertaining that the costs respective to the all rewards are less than a profit associated with the item;
examining the customer data corresponding to a customer, wherein the customer data includes a wish list and a purchase history of the customer; and
selecting the one or more reward for the list of the one or more reward responsive to ascertaining that the one or more reward promotes products appearing in the customer data.

18. The system of claim 13, further comprising:
ascertaining that the item is recovered by the customer who responded to the request for the retrieval, according to terms of the request; and
delivering the reward offered in the request to the customer.

* * * * *